United States Patent [19]
Staniszewski

[11] Patent Number: 6,000,875
[45] Date of Patent: *Dec. 14, 1999

[54] MOUNTING DEVICE

[75] Inventor: Tadeusz Staniszewski, Budd Lake, N.J.

[73] Assignee: Shap, Inc., Budd Lake, N.J.

[ * ] Notice: Under 35 U.S.C. 154(b), the term of this patent shall be extended for 36 days.

[21] Appl. No.: 08/589,780

[22] Filed: Jan. 22, 1996

[51] Int. Cl.⁶ .................................................. F16B 7/04
[52] U.S. Cl. ..................... 403/370; 403/259; 403/261; 403/368
[58] Field of Search ................... 403/261, 259, 403/256, 343, 342, 369, 370, 371

[56] References Cited

U.S. PATENT DOCUMENTS

| | | | |
|---|---|---|---|
| 298,317 | 5/1884 | Sherman | 403/261 |
| 1,195,482 | 8/1916 | Lewis | 403/261 |
| 1,392,363 | 10/1921 | Shannon | 403/261 |
| 1,810,028 | 6/1931 | Paszkowski | 403/261 X |
| 2,513,970 | 7/1950 | Sisulak | 403/259 |
| 5,067,846 | 11/1991 | Staniszewski | 403/259 X |
| 5,203,861 | 4/1993 | Irwin et al. | 474/161 |
| 5,218,882 | 6/1993 | Jacobson | 403/261 X |
| 5,590,565 | 1/1997 | Palfenier et al. | 74/493 |

*Primary Examiner*—Anthony Knight
*Attorney, Agent, or Firm*—Bernard J. Murphy

[57] ABSTRACT

For mounting a machine element having a bore coaxially on a shaft for rotation with the shaft, there are provided a first member having internal threads, and a split sleeve having external threads adapted to be mounted around the shaft and inside the bore. The threads of the split sleeve have apexes at a uniform diameter when unstressed. The first member is threaded on the external threads of the split sleeve. Also, a second member is spaced from the first member by an amount sufficient to allow the first and second members to embrace opposite sides of the machine element. The threads of the first member and the split sleeve are shaped to cause contraction of the sleeve into fast, gripping engagement with the shaft, as the first and second members frictionally clamp the machine element between these first and second members.

6 Claims, 2 Drawing Sheets

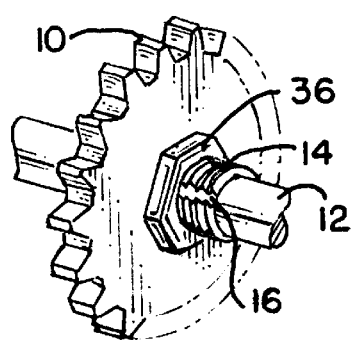
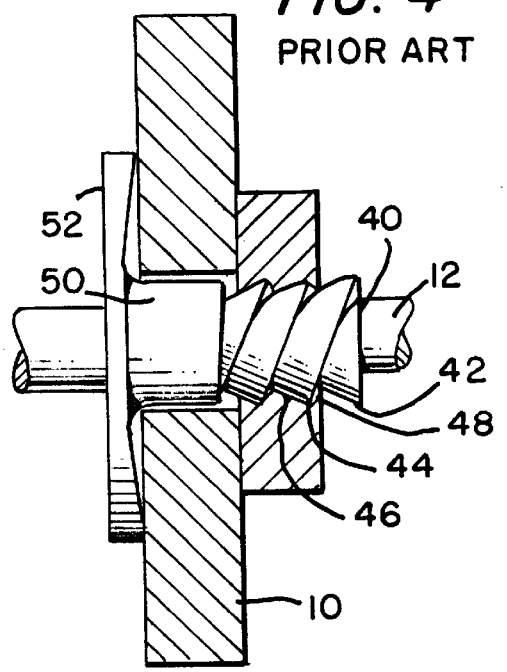
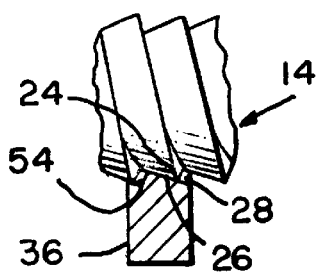
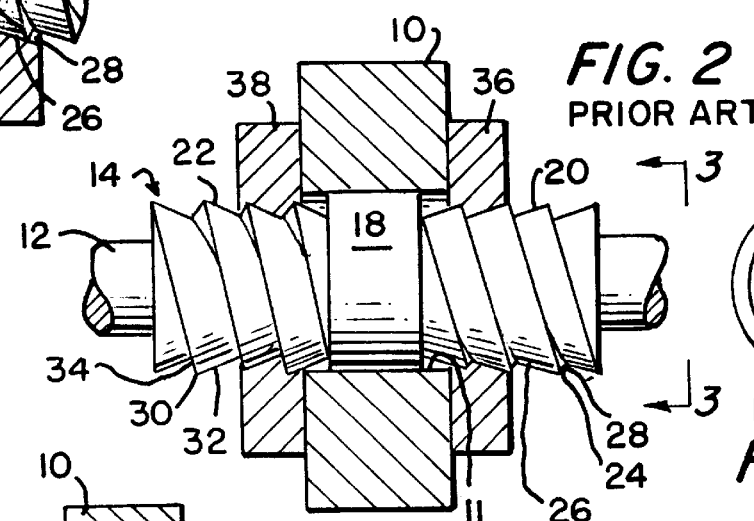
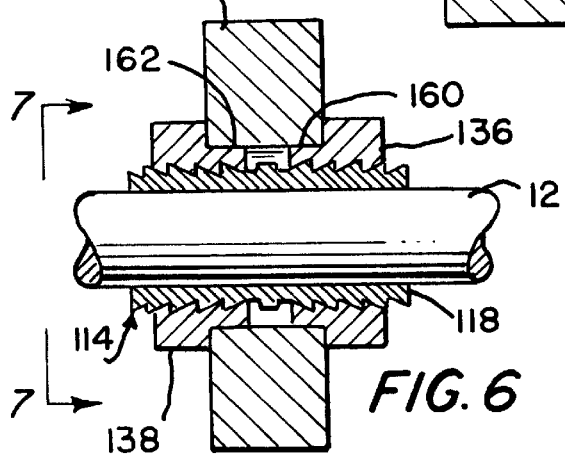
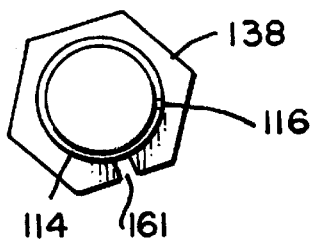

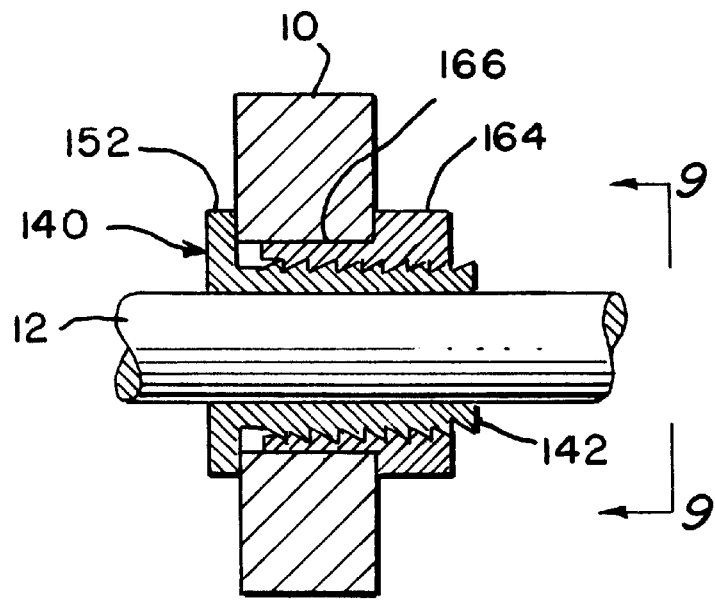
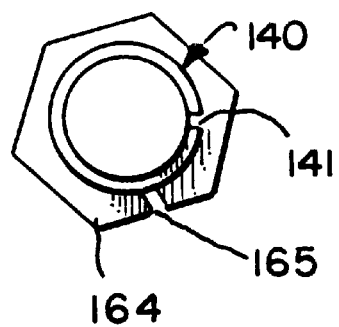
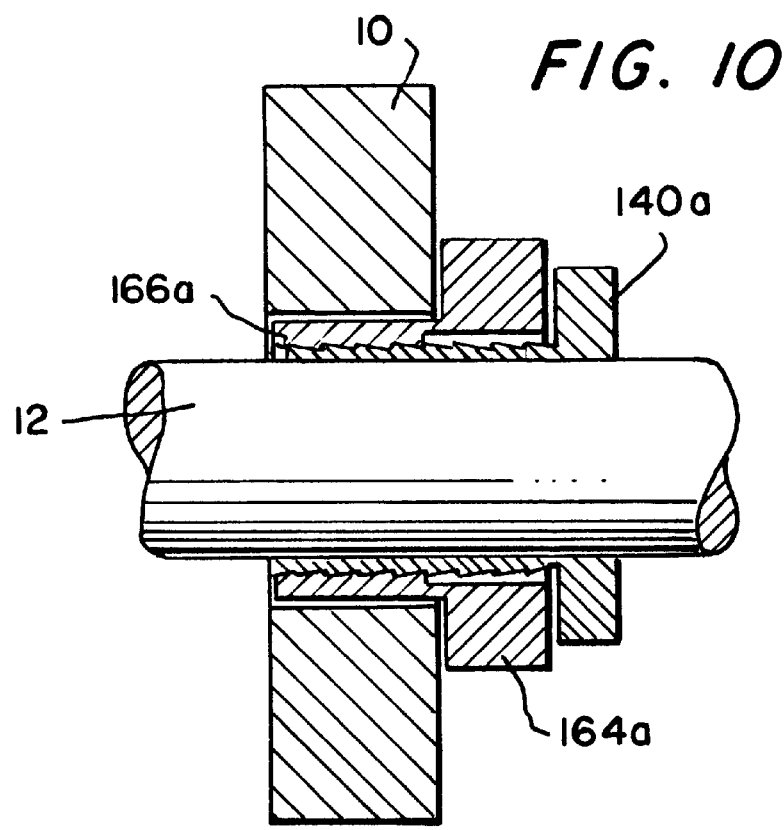

MOUNTING DEVICE

BACKGROUND OF THE INVENTION

The present invention relates to mounting devices and, in particular, to devices for mounting a machine element with a bore coaxially onto a shaft, for common movement with the shaft.

A common mechanical objective is to mount a gear, wheel or pulley onto a shaft for rotation with the shaft. One approach is to closely machine the tolerances so that the element on the shaft is centered. The more accurately the bore is machined the better the concentricity, but the higher the cost.

One known system for mounting a gear to a shaft (for example U.S. Pat. No. 4,345,851) employs two coaxial, nested sleeves that are threaded together. The inner sleeve has a frustro-conical exterior that mates with the frustro-conical interior of the outer sleeve. The inner sleeve is slit and split so that threading the two sleeves together compresses and shrinks the inner sleeve. The outer sleeve has circumferentially spaced segments that are pressed outwardly as the sleeves are threaded together. Thus the nested sleeves may be placed around a sleeve and inside a gear so that when tightened, the sleeves engage and center the gear on the shaft, and hold it securely thereon for rotation therewith.

See also U.S. Pat. Nos. 602,149; 1,380,708; 2,269,132; 3,957,381 4,824,281 4,848,953, and the Application prior U.S. Pat. No. 5,067,846, which disclose alternative mounting arrangements.

A disadvantage with some of these known mounting devices is the relatively large number of parts required and the relative difficulty of manufacturing them, for instance, the expensive and complicated task of forming frustro-conical surfaces as in the aforesaid U.S. Pat. No. 4,345,851.

Accordingly, there is a need for a mounting device which is relatively simple to make for securely mounting a machine element to a shaft coaxially, for movement with the shaft, and a device requiring few and easily manufactured components.

It is an object of this invention to meet the aforesaid need by setting forth a mounting device, for mounting an element having a central bore, on a shaft, via said bore, for movement of said element in common with said shaft, comprising a split sleeve dimensioned to be receivable within said bore; and means for (a) envelopment of at least a portion of said sleeve, (b) entering said bore, (c) clamping said sleeve into fast, radial-gripping engagement with said shaft, (d) expanding into fast, radial-gripping engagement with said bore, and (e) impressing an axial force against the element.

BRIEF DESCRIPTION OF THE DRAWINGS

Further objects, features and advantages of the present invention can be found in the following detailed description of presently preferred but nonetheless illustrative embodiments when taken in conjunction with the accompanying drawings, wherein:

FIG. 1 is a perspective view of a prior art mounting device mounting a machine element on a shaft, as disclosed in the aforesaid U.S. Pat. No. 5,067,846 a machine element on a shaft;

FIG. 2, is a sectional view along the axis of the shaft of FIG. 1;

FIG. 3 is an end view along lines 3—3 of FIG. 2;

FIG. 4 is a sectional view along the shaft axis of another, prior art mounting device that is an alternate to that of FIG. 1;

FIG. 5 is a detailed view of the thread mating between the sleeve and first member of FIG. 1;

FIG. 6, is a sectional view along the shaft axis of a mounting device that is an alternate to that of FIG. 1, according to this invention;

FIG. 7 is a view along lines 7—7 of FIG. 6;

FIG. 8 is a sectional view along the shaft axis of a mounting device that is an alternate to that of FIG. 6;

FIG. 9 is a view along lines 9—9 of FIG. 6; and

FIG. 10 is an axial cross-sectional view of another, alternative embodiment of the invention.

FIGS. 1 through 5 illustrate the mounting device of U.S. Pat. No. 5,067,846, as background, toward an understanding of the instant invention, and the ensuing, corresponding descriptive text is presented for the same, background understanding purposes.

Referring to FIGS. 1, 2, and 3 a machine element 10 is shown in the form of a gear, although a wheel, pulley or other element can be employed instead. Gear 10 has central bore 11 into which is mounted a shaft 12, having a cylindrical exterior. Mounted over shaft 12 and inside bore 11 is a split sleeve 14 having a split 16. Sleeve 14 has an unthreaded cylindrical midsection 18 bounded by a first threaded section 20 on one side and on the other by second threaded section 22. Both threaded sections 20 and 22 have right handed threads, although left handed threads can be used if desired.

First threaded section 20 has threads with apexes 24. Apex 24 is bounded by an inside slope 26 and outside slope 28. Outside slope 28 is steeper than inside slope 26. Threaded section 22 has threads, each with an apex 30 having an inside slope 32 and a relatively steeper outside slope 34. In this illustrated embodiment, the profile of the threads is a saw tooth, although in other embodiments different profiles may be used. It is desirable, however, that the profiles be asymmetric and that the asymmetry reverses from one side of the gear 10 to the other. In this specific case, the inside slope of the threads is not as steep as the outside slope.

In this embodiment, threaded sections 20 and 22 have threaded onto them a first member 36 and second member 38, respectively. Members 36 and 38 are shown as hexagonal nuts having internal threads with asymmetric threads that complement the threads on sleeve 14.

Referring to FIG. 4, it shows previously illustrated gear 10 mounted around shaft 12. Split sleeve 40 has a threaded section 42 with left handed threads. The apex of each thread of section 42 again has an asymmetric profile with the apex of each thread having an inside slope 46 and a relatively steeper outside slope 48. Unthreaded midsection 50 is adjacent to flange 52, which has a concave interior surface.

To facilitate an understanding of the principles associated with the foregoing apparatus, the operation of the device of FIGS. 1–3 will be explained in connection with the partial sectional view of FIG. 5. It will be appreciated that the operation of the device of FIG. 4 is substantially the same, except that flange 52 replaces one of the gear-clamping members, i.e., member 38.

The device of FIG. 1 is assembled by first slipping the split sleeve 14 over shaft 12. Sleeve 14 is centered at the position where the gear or other machine element is to be positioned and made fast thereon. Thereafter, gear 10 can be centered on the unthreaded midsection 18. Next, members 36 and 38 are threaded onto sections 20 and 22, respectively. The members 36 and 38 are installed in a balanced fashion so that the gear 10 remains centered on the sleeve 14. When the members 36 and 38 are finger tight, they may be tightened with a wrench or other appropriate device. As pressure is increased by turning members 36 and 38, the internal threads of these devices slide on the sleeve 14 as shown in FIG. 5. This sliding produces the gap 54. Consequently, the clearance for sleeve 14 is reduced and sleeve 14 is compressively shrunk or contracted. During such contraction, split 16 narrows, causing sleeve 14 to grip shaft 12 tightly and causing the nuts 36 and 38 to frictionally clamp the gear 10 therebetween. It will be appreciated that this operation keeps the gear 10 centered coaxially on shaft 12, and clamped thereto for rotation therewith. FIGS. 6 through 10 illustrate embodiments of the instant invention.

Referring to FIGS. 6 and 7, components here and in subsequent FIGS that correspond to previously illustrated components have the same reference numerals unless modified, in which case they were increased by one hundred. Previously mentioned machine element 10 is again mounted on shaft 12, which has a cylindrical exterior. Mounted over shaft 12 and inside element 10 is a split sleeve 114 having a split 116. Sleeve 114 has an unthreaded cylindrical midsection bounded by a first threaded section on one side and on the other by second threaded section. Both threaded sections have right handed threads, although left handed threads can be used if desired. The threads of sleeve 114 are the same as previously illustrated sleeve 14 (FIG. 1).

In this embodiment, sleeve 114 has threaded onto it a first member 136 and second member 138, respectively. Members 136 and 138 are shown as hexagonal nuts having internal threads with asymmetric threads that complement the threads on sleeve 114. Members 136 and 138 have annular necks 160 and 162, respectively, whose exteriors are cylindrical and sized to match the inside diameter of element 10. Members 136 and 138 are also split at break 161. Upon torquing of the members 136 and 138 onto the sleeve 114, again the sleeve contracts into fast, gripping engagement with the shaft 12, and the necks 160 and 162 expand into frictionally-clamping engagement with the bore of the gear 10, while the confronting shoulders of the members 136 and 138 impress opposing, axial forces to the gear, to enhance the clamping engagement.

FIGS. 8 and 9 show previously illustrated gear 10 mounted around shaft 12. Split sleeve 140 has a threaded section 142 with left handed threads. Sleeve 140 is split at break 141. The apex of each thread of section 142 again has an asymmetric profile. Adjacent to threaded section 142 is flange 152. Member 164 is a nut similar to member 136 of FIG. 6, except for the addition of an annular neck 166.

To facilitate an understanding of the principles associated with the foregoing apparatus, the operation of the device of FIGS. 8 and 9 will be described.

The device of FIG. 8 is assembled by first slipping the split sleeve 140 over shaft 12. Sleeve 140 is centered at the position where the gear or other machine element is to be positioned. Thereafter, gear 10 can be positioned as shown. Next, member 164 is threaded onto sleeve 140. The members 140 and 164 are installed in a balanced fashion so that the gear 10 remains centered on the shaft 12. When the members 140 and 164 are finger tight, they may be tightened further with a wrench or other appropriate tool. As pressure is increased, the threads of these devices slide as previously described in connection with FIG. 5. Consequently, sleeve 140 is compressively contracted while member 164 is expanded. During such change, split 141 narrows, while split 165 expands. As a result, sleeve 140 grips shaft 12 tightly and member 164 grips gear 10 tightly. Simultaneously the shoulder of member 164 and the flange 152 axially squeeze opposite faces of gear 10. It will be appreciated that this operation keeps the gear 10 firmly centered coaxially on shaft 12, and held fast thereon for rotation in common therewith.

When torque is applied through shaft 12 to gear 10 with the device of FIG. 6, the members 136 are torqued in the same direction. Thus the members tend to stay tight on sleeve 114. When torque is applied through shaft 12 to gear 10 with the device of FIG. 8, member 164 torqued in a direction to either tighten or loosen the member 164. Loosening of member 164 can be prevented by either sufficient tightening, cotter pins, lock nuts or other known locking means. Alternatively, for systems tolerating only unidirectional rotation, the loosening of member 164 may be permitted as a safety mechanism for preventing incorrect rotation.

It is to be appreciated that various modifications may be implemented with respect to the above described preferred embodiments. In particular, the threads can have various profiles, depending upon the mechanical advantage which is desired and the need to avoid skipping of the threads. Also the length, thickness and the other dimensions of the illustrated components can be altered depending upon the size of the shaft and gear (or other machine element). Also, the number of threads can be altered depending upon the thickness of the nuts and the desired holding strength.

Obviously many modifications and variation of the present invention are possible in light of the above teachings. It is therefore to be understood that within the scope of the appended claims, the invention may be practiced otherwise than as specifically described. For example, a further embodiment of the invention is shown in FIG. 10. Here the gear 10 is secured onto the shaft 12 with a sleeve 140a and a single clamping member 164a, the two aforesaid components being set into the bore of the gear 10 from only one side of the gear, leaving the opposite side of the gear unobstructed. Again, sleeve 140a has a same split 141 (not shown) which narrows, as the sleeve 140a is contracted. Too, the single clamping member 164a has a split 165 (not shown) which expands, as the member 164a is torqued onto the sleeve 140a, and the threads of the member ride upon the threads of the sleeve, as priorly explained, and the consequently expanding neck 166a of the member 164a frictionally engages the bore of the gear. The shoulder portion of the member 164a too impresses an axial force against the gear 10.

The aforesaid and any other alternative embodiments of the invention, as will occur to other by taking teaching from my disclosure herein, are deemed to be within the ambit of my invention, and embraced by the appended claims.

I claim:

1. A mounting device, for mounting an element having a central bore, on a shaft, via said bore, for movement of said element in common with said shaft, comprising:

a split sleeve dimensioned to be receivable within said bore; and means for (a) envelopment of at least a portion of said sleeve, (b) entering said bore, (c) clamping said sleeve into fast, radial-gripping engagement with the shaft, (d) expanding into fast, radial-gripping engagement with said bore, and (e) impressing an axial force against the element.

2. A mounting device, according to claim 1, wherein:

said means comprises an annular member having an internally-threaded neck and a shoulder contiguous with said neck;

said sleeve has external threads formed thereon; and said member is threadedly engageable with said external threads of said sleeve.

3. A mounting device, according to claim 1, wherein;

said sleeve has a planar component integral therewith; and said component comprises means for impressing an axial force against said element.

4. A mounting device, according to claim 3, wherein:

said component comprises a flange.

5. A mounting device, according to claim 1, wherein:

said means comprises a pair of annular members, each thereof having an internally-threaded neck and a shoulder contiguous with said neck;

said sleeve has external threads formed thereon; and said members are threadedly engaged with said sleeve and in mutually confronting disposition, said necks facing each other upon said sleeve.

6. A mounting device, according to claim 1, wherein:

said means comprises an annular shoulder for engaging a lateral surface of the element; and said sleeve has a flange for confronting and closing upon said shoulder of said means.

\* \* \* \* \*